Dec. 8, 1964    W. T. BURTON    3,160,545
TIRE BUILDING DRUM
Filed Aug. 1, 1962    2 Sheets-Sheet 1
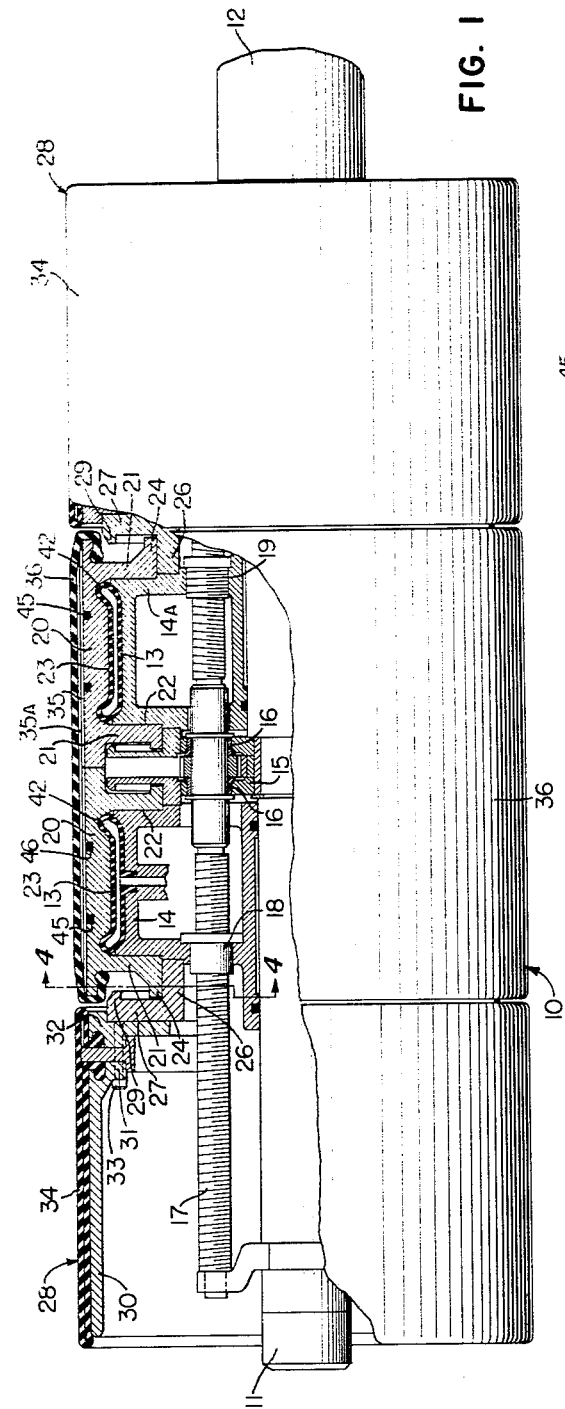
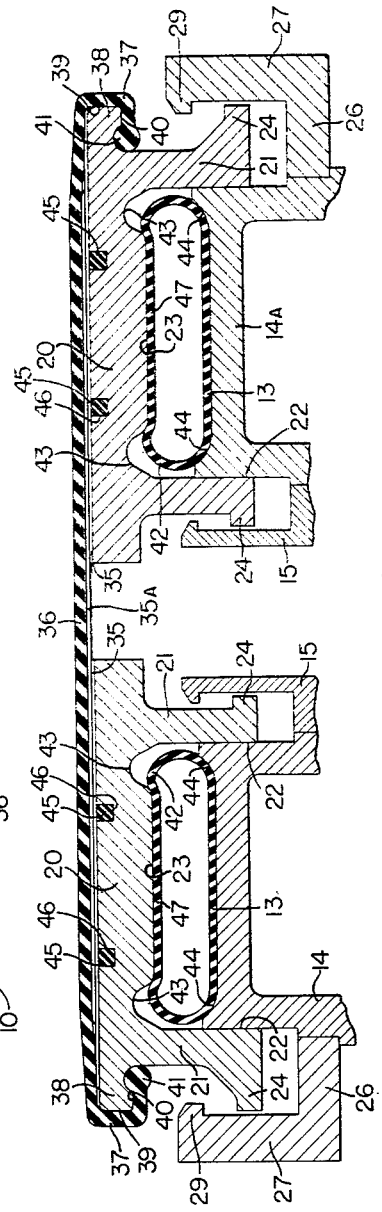
*INVENTOR.*
WILLIAM T. BURTON
BY
*J.B. Holden*
ATTORNEY Dec. 8, 1964   W. T. BURTON   3,160,545
TIRE BUILDING DRUM
Filed Aug. 1, 1962   2 Sheets-Sheet 2
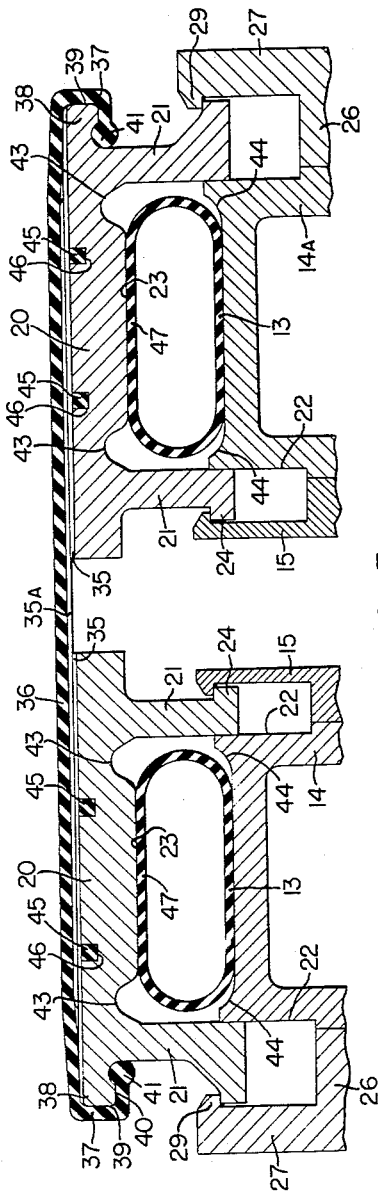
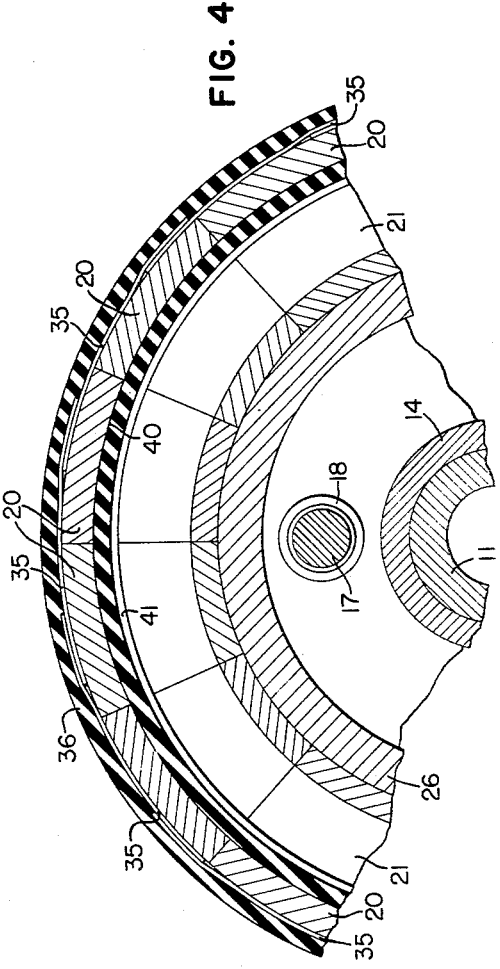
INVENTOR.
WILLIAM T. BURTON
BY
J. O. Holden
ATTORNEY

United States Patent Office 3,160,545
Patented Dec. 8, 1964

3,160,545
TIRE BUILDING DRUM
William T. Burton, Akron, Ohio, assignor to The Goodyear Tire & Rubber Company, Akron, Ohio, a corporation of Ohio
Filed Aug. 1, 1962, Ser. No. 214,069
6 Claims. (Cl. 156—415)

This invention relates to a drum or form for building tires and, more particularly, to improvements in a drum for building a pneumatic tire which is radially expandable.

In building or assembling pneumatic tires by the so-called flat band process, ply material consisting of parallel textile or metallic cords embedded in rubber is wrapped or placed about a substantially cylindrical outer surface of a rigid drum or building form and stitched together, and the circumferentialy marginal edges of the ply material are turned radially inward over the ends or shoulders of the drum so that circular bead rings may be placed against the inturned edges of the ply material. The ply endings are then folded about the bead rings to retain the latter in place. It has been found advantageous to form the shoulder in the plies by applying the plies to a cylindrical drum and thereafter radially expanding the drum and the central portion of the ply to thus form shoulders in the ply material against which the beads are placed.

In conventional drums expanded by bladders having an ellipitical shape in cross section when uninflated, the effective working cross section decreases as the bladders expand, since the bladders must be reinforced and are substantially inextensible. Therefore, they tend to assume a circular shape upon being inflated. This fact materially restricts the number of plies which may be applied and expanded by the drum for a given air pressure, or greatly increases the air pressure requirements, or materially limits the amount of expansion.

The principal object of this invention is to provide an improved tire building drum of substantially cylindrical shape which is expandable radially from a lesser to a greater diameter by means of an annular inflatable, but substantially inextensible, tube or bladder having a substantially greater effective working cross section in relation to the actual perimeter of the bladder, so that the drum may be expanded with a greater number of plies thereon at the same air pressure in the bladder, or at a substantially lesser air pressure with fewer plies on the drum, or may be expanded a greater amount with the same air pressure and number of plies.

Another object of the invention is to provide a tire building drum of substantially cylindrical shape which is radially expandable by an annular bladder having a unique contour in its uninflated position which cooperates with a cavity shape such that during deflation of the bladder, the bladder is returned to its collapsed shape with a rolling action to minimize chafing of the bladder against the surfaces of the containing cavity.

Another object of the invention is to provide a cylindrical drum radially expandable by inflating bladders and having elastic bands positioned directly over and symmetrical with the bladders.

Other objects, uses, and advantages of the invention will become more apparent to those skilled in the art from the following description and drawings, in which FIG. 1 is a fragmentary longitudinal sectional view of the tire building drum of the invention with parts broken away, and parts in cross section;

FIG. 2 is an enlarged partial sectional view of the drum showing the drum partially expanded;

FIG. 3 is a view similar to FIG. 2 showing the drum fully expanded;

FIG. 4 is a cross-sectional view taken along the line 4—4 of FIG. 1.

Referring, more particularly, to the drawings in which like parts are referred to by the same numeral throughout, a tire building drum 10 is mounted for rotation upon a rotatable shaft 11 secured to a spindle 12 which is rotated in either direction by a suitable power unit. The drum 10 consists of a plurality of sections each of which may be radially expanded by means of an inflatable annular bladder or bag 13 which are mounted, respectively, upon a spider 14 and 14a. The spiders 14 and 14a are axially slidably mounted upon the shaft 11. A central spider 15 is fixed to shaft 11 and is provided with journals 16 which rotatably support shaft 17 threaded to members 18 and 19 connected to the spiders 14 and 14b. Rotation of the shaft 17 will cause spiders 14 and 14b to move axially relative to central spider 15 to thereby axially expand the drum.

The spiders 14 and 14a support, respectively, a plurality of rigid elongated circumferential narrow elements 20 having depending radially inwardly extending legs 21 which straddle the lateral surfaces 22 of the spiders 14 and 14a. Elements 20 are provided with a radially inner flat surface 23 which engages the radially outer surface of the annular bags 13. The depending legs 21 terminate in a flange 24 which engages a flange 26 on the members 27 for positively stopping the radially inner movement of the elements 20. Likewise, the flanges 24 engage an annular flange 29 provided on the members 27 when the bladder 13 is inflated to radially expand the drum to the position shown in FIG. 3.

A suitable ply turn-up device 28 is secured to each end of the drum which comprises a rigid cylindrical support 30 having a radially depending flange 31 which engages the outboard members 32 and is secured by a plurality of bolts 33 directly to the members 32 of the drum. An annular inflatable flexible rubber tube or bag 34 is mounted on the support 30 and in its uninflated position the tube or bag 34 has an outer diameter substantially the same as the outer diameter of the drum. The tube or bag 34 is inflatable into a torque shape to lift the ply endings and turn them around the bead ring after which the bags are contacted by suitable pushing members and moved axially of the drum in a manner well known in the art.

As shown in FIG. 3, each of the elements 20 is provided with thin metal arcuate shape cover plates 35 suitably secured thereto which are coextensive with the complete length of elements 20. Plates 35 extend circumferentially beyond elements 20 into overlapping engagement with adjacent plates so as to bridge the spaces between the elements as the drum is radially expanded. The elements 35A extend axially of the elements 20 into overlapping relationship so that elements 35A bridge the axial gaps existing between the elements 20 when the drum is axially expanded.

The plates 35 and elements 35A provide a radially and circumferentially rigid work surface for the drum. In order to eliminate any bridging of the tire fabric across the edges of the plates 35Y and elements 35A, a cylindrical flexible stretchable elastomeric cover 36 completely encloses the plates 35. Cover 36 is provided at each end with radially inwardly extending portions 37 which extend around the shoulder 38 of the elements 20, across the radially extending surface 39 and coextensively across the axially extending surface 40. The ends of the cover or sleeve 36 terminate in an enlarged bead 41.

In accordance with this invention, the expanding bladders 13 are provided with a substantially U-shape in cross section in their uninflated position with the lobe shaped end portions 42 extending in a radially outward direction and with the curved surface 43 of the elements 20 and the curved surface 44 of the spiders 14 and 14a forming a U-shaped cavity in cross section conforming to the contour of the uninflated tube 13. One or more elastic bands 45 are positioned in grooves 46 in each of the elements 20 with the bands 45 extending circumferentially around the drum and positioned symmetrically with the center line of each of the bladders 13 and preferably axially inwardly of the lobes 42.

Bladders 13 have a uniform wall thickness and the central portion extends in cross section substantially axially of the drum whereas the end portions 42 terminate in radially outwardly extending lobes conforming to the shape of the cavity within which the bladders 13 are positioned. As the bladders 13 are inflated, the lobe shaped end portions 42 roll out of engagement with the curved shaped surfaces 43 of the elements 20 but the central portion 47 of the bladder remains in contact with the axially extending portion 23. Upon further inflation of the bladder 13 to the fully expanded position shown in FIG. 3 the lobe shaped portion 42 of the bladder rolls out of contact with the surface 43 and engages substantially the entire flat surface 23 of the elements 20. Likewise, the lobe portion 42 rolls out of engagement with the curved surface 44 of the spiders 14 and 14a. Upon deflation of the bladders 13, the lobe end portions of the bladder return to the position shown in FIG. 1 by a rolling action which is the reverse of that described above so that chafing of the bladder 13 against the walls of the members 20 is minimized.

While certain representative embodiments and details have been shown for the purpose of illustrating the invention, it will be apparent to those skilled in this art that various changes and modifications may be made therein without departing from the spirit or scope of the invention.

What is claimed is:

1. A rotary tire building drum construction comprising a rotatably mounted spider, a plurality of elements mounted on said spider for movement from a radially inner to a radially outer position and which collectively define a substantially cylindrical work surface, an inextensible inflatable annular tube disposed between said spider and said elements, said tube having in cross section a central portion which extends axially, and end portions which extend radially of said drum, the portions of said elements and said spider which contact said uninflated tube forming in cross section a cavity which conforms to the cross-sectional contour of said uninflated tube, said cavity being formed by curved surfaces engaging said radially extending end portions of said tube when the tube is uninflated.

2. A rotary tire building drum construction comprising, a rotatably mounted spider, a plurality of elements mounted on said spider for movement from a radially inner to a radially outer position and which collectively define a substantially cylindrical work surface, an inextensible inflatable annular tube disposed between said spider and said elements, said tube having a uniform wall thickness and a central portion which extends in cross section substantially axially of said drum, said portions terminating in radially extending lobes at the ends thereof, said elements having portions engaging said lobes when the bag is uninflated, the portions of said elements and said spider which contact said uninflated tube forming a U-shaped cavity in cross section conforming to the outer cross-sectional contour of said uninflated tube.

3. A rotary tire building drum construction comprising, a rotatably mounted spider, a plurality of elements which are mounted on said spider and movable from a radially inner to a radially outer position, said elements collectively defining a substantially cylindrical work surface, an inflatable annular tube made of inextensible flexible material disposed between said spider and said elements, the radially inner surface of said elements being in contact with said tube and having a convex central portion terminating in concave end portions, the portion of said spider contacting said tube having a flat central portion and radially curved end portions, the said portions of said elements and spider defining a U-shaped cavity in which the tube is positioned, the outer surface of said tube substantially conforming to the contour of said cavity when uninflated.

4. A rotary tire building drum construction comprising, a rotatably mounted spider, a plurality of elements which are movable on said spider from a radially inner to a radially outer position and which collectively define a substantially cylindrical work surface, an inflatable annular tube made of inextensible flexible material disposed between said spider and said elements, said tube having an axially extending central portion terminating in radially outwardly extending lobes, said elements having portions conforming to the curvature of said lobes, said elements and said hub which contact said tube forming a cavity which in cross section conforms to the cross-sectional contour of said uninflated tube and at least one endless elastic band extending circumferentially around said drum and positioned in circumferential grooves in the outer surface of said elements, and disposed in symmetrical position with the radial cross-sectional center line of said tube.

5. A rotary tire building drum as claimed in claim 5 in which said bands are symmetrically located axially relative to the center line of said tube and located axially inwardly of said radially outwardly extending end portions.

6. A rotary tire building drum construction comprising, a rotatably mounted spider, a plurality of elements mounted on said spider for movement from a radially inner to a radially outer position and which collectively define a substantially cylindrical work surface, an inextensible inflatable annular tube disposed between said spider and said elements, said tube having in cross section a central portion which extends axially, and end portions which extend radially of said drum, the portions of said elements and said spider which contact said uninflated tube forming in cross section a cavity which conforms to the cross-sectional contour of said uninflated tube, said cavity being formed by curved surfaces engaging said radially extending end portions of said tube when the tube is uninflated, said tube when inflated being disengaged from said curved surfaces.

References Cited in the file of this patent
UNITED STATES PATENTS

| | | |
|---|---|---|
| 2,614,951 | Iredell | Oct. 21, 1952 |
| 2,614,952 | Kraft | Oct. 21, 1952 |
| 3,053,308 | Vanzo et al. | Sept. 11, 1962 |
| 3,077,917 | Appleby | Feb. 19, 1963 |
| 3,101,289 | Giletta et al. | Aug. 20, 1963 |